(12) United States Patent
Patterson et al.

(10) Patent No.: US 11,597,495 B2
(45) Date of Patent: Mar. 7, 2023

(54) VENTED HAT STRINGERS AND METHODS OF FORMING THE SAME

(71) Applicant: The Boeing Company, Chicago, IL (US)

(72) Inventors: Steve L. Patterson, Glen Mills, PA (US); Daniel M. Levine, Seattle, WA (US); Jeffrey E. Barnes, Shoreline, WA (US); Jeffrey F. Stulc, Stanwood, WA (US); Christopher R. Loesche, Bothell, WA (US); Garrett C. Hanson, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/389,714

(22) Filed: Jul. 30, 2021

(65) Prior Publication Data

US 2023/0030180 A1     Feb. 2, 2023

(51) Int. Cl.
*B64C 1/00*      (2006.01)
*B64C 3/18*      (2006.01)
*B64C 1/06*      (2006.01)

(52) U.S. Cl.
CPC .............. *B64C 3/182* (2013.01); *B64C 1/064* (2013.01)

(58) Field of Classification Search
None
See application file for complete search history.

(56) References Cited

U.S. PATENT DOCUMENTS

| | | | |
|---|---|---|---|
| 8,763,253 B2 | 7/2014 | Kamaraj et al. | |
| 9,399,509 B2 | 7/2016 | Rolfes | |
| 2010/0304094 A1 | 12/2010 | Brook et al. | |
| 2012/0261057 A1 | 10/2012 | Bergmann et al. | |
| 2016/0052617 A1 | 2/2016 | Rolfes et al. | |
| 2016/0368617 A1 | 12/2016 | Best, III | |
| 2019/0270508 A1 | 9/2019 | Cass et al. | |
| 2020/0010176 A1* | 1/2020 | Douglas | B64C 3/182 |
| 2020/0231267 A1 | 7/2020 | Rotter et al. | |

* cited by examiner

*Primary Examiner* — Alexander S Thomas
(74) *Attorney, Agent, or Firm* — Quinn IP Law (57) ABSTRACT

A vented hat stringer for an aircraft comprises a first hat-stringer leg with a first-hat-stringer-leg surface, a second hat-stringer leg with a second-hat-stringer-leg surface, a first hat-stringer sidewall, a second hat-stringer sidewall, and a hat-stringer connecting wall, comprising a hat-stringer-connecting-wall surface and a virtual hat-stringer-connecting-wall symmetry plane, passing through hat-stringer connecting wall. The vented hat stringer further comprises a ventilation opening, extending through at least one of the first hat-stringer sidewall or the hat-stringer connecting wall, or extending through at least one of the second hat-stringer sidewall or the hat-stringer connecting wall. The ventilation opening defines a ventilation-opening centerline, wherein the ventilation-opening centerline does not coincide with the virtual hat-stringer-connecting-wall symmetry plane.

20 Claims, 10 Drawing Sheets

VENTED HAT STRINGERS AND METHODS OF FORMING THE SAME

TECHNICAL FIELD

Described herein are vented hat stringers for aircraft and methods for forming vented hat stringers.

BACKGROUND

Some structures, such as aircraft, include structural components that are stiffened with hat stringers. The hat stringers additionally or alternatively provide a ventilation path for fluid, such as, but not limited to, air and/or fuel vapor, associated with the structural component. To accommodate a ventilation system connection, the hat stringers are provided with one or more holes therein, thus affecting the rigidity of the hat stringers.

SUMMARY

Accordingly, apparatuses and methods, intended to address at least the above-identified concerns, would find utility.

The following is a non-exhaustive list of examples of the subject matter, disclosed herein.

Disclosed herein is a vented hat stringer for an aircraft. The vented hat stringer comprises a first hat-stringer leg that comprises a first-hat-stringer-leg surface. The vented hat stringer also comprises a second hat-stringer leg that comprises a second-hat-stringer-leg surface. The second hat-stringer leg is spaced apart from the first hat-stringer leg. The vented hat stringer further comprises a first hat-stringer sidewall, comprising a first-hat-stringer-sidewall surface that extends from the first-hat-stringer-leg surface. The vented hat stringer 100 additionally comprises a hat-stringer connection wall, comprising a hat-stringer-connection-wall surface, extending from the first-hat-stringer-leg surface, and a virtual hat-stringer-connection-wall symmetry plane, passing through the hat-stringer-connection-wall surface. The vented hat stringer also comprises a second hat-stringer sidewall, comprising a second-hat-stringer-sidewall surface that extends from the hat-stringer-connection-wall surface to the second-hat-stringer-leg surface. The vented hat stringer further comprises a ventilation opening, extending through at least one of the first hat-stringer sidewall or the hat-stringer connection wall, or extending through at least one of the second hat-stringer sidewall or the hat-stringer connection wall. The ventilation opening defines a ventilation-opening centerline, wherein the ventilation-opening centerline does not coincide with the virtual hat-stringer-connection-wall symmetry plane.

Providing the vented hat stringer, having the hat-stringer connection wall defining the virtual hat-stringer-connection-wall symmetry plane, with the ventilation opening located so that the ventilation-opening centerline does not coincide with the virtual hat-stringer-connection-wall symmetry plane, improves the rigidity of the vented hat stringer, thereby improving the support strength of the vented hat stringer without increasing the weight of the vented hat stringer.

Also disclosed herein is a method of forming the vented hat stringer. The method comprises forming each of a first hat-stringer leg, a second hat-stringer leg, a first hat-stringer sidewall, a hat-stringer connection wall, and a second hat-stringer sidewall from a plurality of plies of composite material such that the ventilation-opening centerline does not coincide with the virtual hat-stringer-connecting-wall symmetry plane.

Forming each of the first hat-stringer leg, the second hat-stringer leg, the first hat-stringer sidewall, the second hat-stringer sidewall, and the hat-stringer connection wall from a plurality of plies of composite material enables fabrication of the vented hat stringer using the same manufacturing techniques, thereby reducing fabrication time and expense. Forming the vented hat stringer such that the ventilation-opening centerline does not coincide with the virtual hat-stringer-connection-wall symmetry plane increases the amount of mass of the vented hat stringer located in the hat-stringer connection wall, thereby increasing stiffness and rigidity.

Also disclosed herein is an aircraft, comprising a skin portion that has an inner side. The aircraft also comprises the vented hat stringer, which is coupled to the inner side of the skin portion.

The vented hat stringer provides advantages when used on an aircraft. The vented hat stringer reinforces the skin portion of the aircraft, enabling the skin portion to be made from a thinner material and reducing overall weight of the aircraft.

BRIEF DESCRIPTION OF THE DRAWINGS

Reference will now be made to the accompanying drawings, which are not necessarily drawn to scale, and where like reference characters designate the same or similar parts throughout the several views. In the drawings.

DETAILED DESCRIPTION

Figure 1:
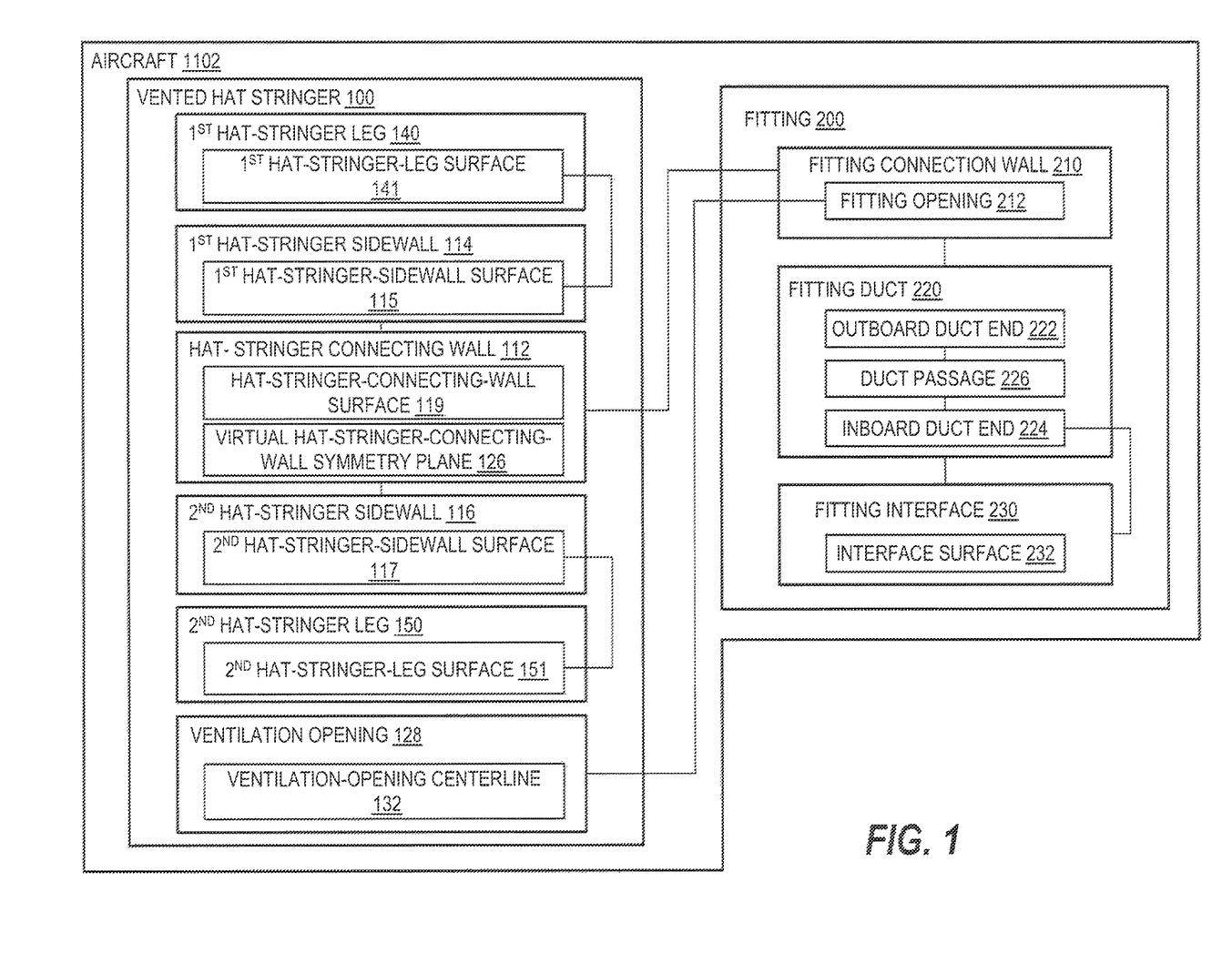
FIG. 1 is a block diagram of an aircraft having a vented hat stringer, according to one or more examples of the subject matter, disclosed herein.

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

Figure 13:
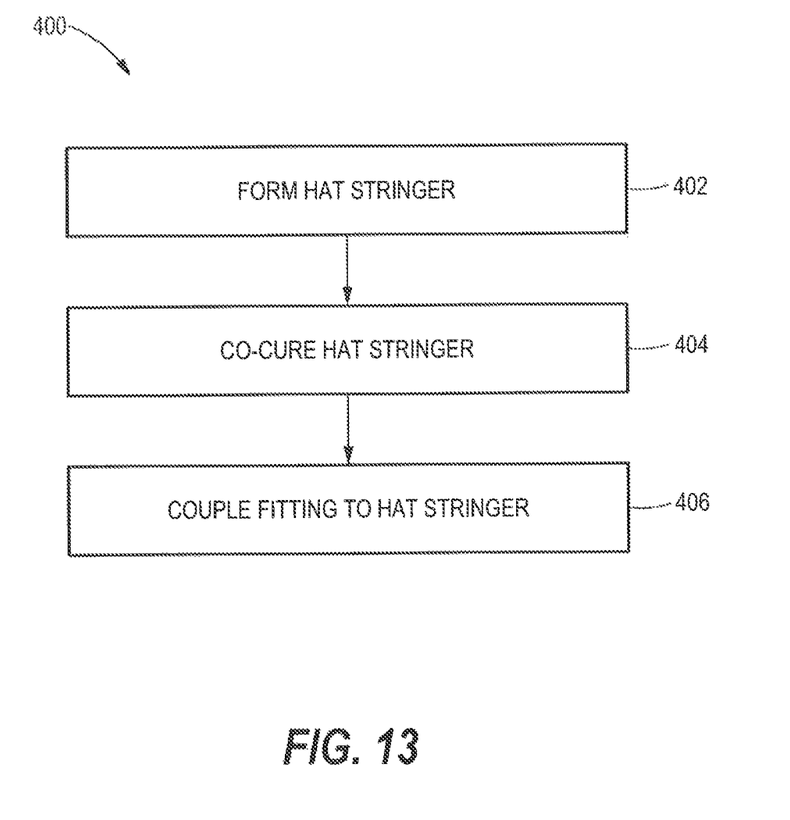
FIG. 13 is a block diagram of a method, according to one or more examples of the subject matter, disclosed herein, of forming a vented hat stringer, according to one or more examples of the subject matter, disclosed herein.

In FIG. 13, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 13 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples of the subject matter, disclosed herein, are provided below.

Referring generally to FIG. 1 and particularly to, e.g., FIGS. 2-5 for illustrative purposes only and not by way of limitation, the following portion of this paragraph delineates example 1 of the subject matter, disclosed herein. According to example 1, vented hat stringer 100 comprises first hat-stringer leg 140 that comprises first-hat-stringer-leg surface 141. Vented hat stringer 100 also comprises second hat-stringer leg 150 that comprises second-hat-stringer-leg surface 151. Second hat-stringer leg 150 is spaced apart from first hat-stringer leg 140. Vented hat stringer 100 further comprises first hat-stringer sidewall 114, comprising first-hat-stringer-sidewall surface 115 that extends from first-hat-stringer-leg surface 141. Vented hat stringer 100 additionally comprises hat-stringer connecting wall 112, comprising hat-stringer-connecting-wall surface 119, extending from first-hat-stringer-leg surface 141, and virtual hat-stringer-connecting-wall symmetry plane 126, passing through hat-stringer-connecting-wall surface 119. Vented hat stringer 100 also comprises second hat-stringer sidewall 116, comprising second-hat-stringer-sidewall surface 117 that extends from hat-stringer-connecting-wall surface 119 to second-hat-stringer-leg surface 151. Vented hat stringer 100 further comprises ventilation opening 128, extending through at least one of first hat-stringer sidewall 114 or hat-stringer connecting wall 112, or extending through at least one of second hat-stringer sidewall 116 or hat-stringer connecting wall 112. Ventilation opening 128 defines ventilation-opening centerline 132, wherein ventilation-opening centerline 132 does not coincide with virtual hat-stringer-connecting-wall symmetry plane 126.

Providing vented hat stringer 100, having hat-stringer connecting wall 112 defining virtual hat-stringer-connecting-wall symmetry plane 126, with ventilation opening 128 located so that ventilation-opening centerline 132 does not coincide with virtual hat-stringer-connecting-wall symmetry plane 126, improves the rigidity of vented hat stringer 100, thereby improving the support strength of vented hat stringer 100 without increasing weight of vented hat stringer 100.

Vented hat stringer 100 is configured to have improved strength and torque resistance, thereby reducing weight of vented hat stringer 100 and/or components supported by vented hat stringer 100. Vented hat stringer 100 is further configured to facilitate connection and positioning of ancillary components, such as vent system components, in areas having limited space, by facilitating placement at either side of vented hat stringer 100.

As used herein, "virtual" means having the attributes of an entity without possessing its physical form. For example, a virtual reference plane is an intangible or imaginary plane, rather than a physical one, with respect to which, e.g., location and/or orientation of other physical and/or intangible entities may be defined. Virtual hat-stringer-connecting-wall symmetry plane 126 is a plane extending through hat-stringer connecting wall 112 that cuts hat-stringer connecting wall 112 into two mirrored halves.

Locating ventilation opening 128 such that ventilation-opening centerline 132 does not coincide with virtual hat-stringer-connecting-wall symmetry plane 126 increases the amount of mass of vented hat stringer 100 located in hat-stringer connecting wall 112, thereby increasing stiffness and rigidity of vented hat stringer 100. In one or more examples, ventilation opening 128 is oriented toward a side of vented hat stringer 100, thereby facilitating connection of ventilation opening 128 to ancillary components, such as vent system components, positioned to the side of vented hat stringer 100.

Referring generally to FIG. 1 and particularly to, e.g., FIGS. 2-5 for illustrative purposes only and not by way of limitation, the following portion of this paragraph delineates example 2 of the subject matter, disclosed herein. According to example 2, which encompasses example 1, above, first-hat-stringer-leg surface 141 is planar, second-hat-stringer-leg surface 151 is planar and first-hat-stringer-leg surface 141 and the second-hat-stringer-leg surface 151 are co-planar. Additionally, first-hat-stringer-sidewall surface 115 is planar, wherein first-hat-stringer-sidewall surface 115 is oblique to or perpendicular to first-hat-stringer-leg surface 141, hat-stringer-connecting-wall surface 119 is arcuate, and virtual hat-stringer-connecting-wall symmetry plane 126 extends perpendicular to first-hat-stringer-leg surface 141 and second-hat-stringer-leg surface 151. Second-hat-stringer-sidewall surface 117 is planar, wherein second-hat-stringer-sidewall surface 117 is oblique to or perpendicular to second-hat-stringer-leg surface 151.

Figure 3:
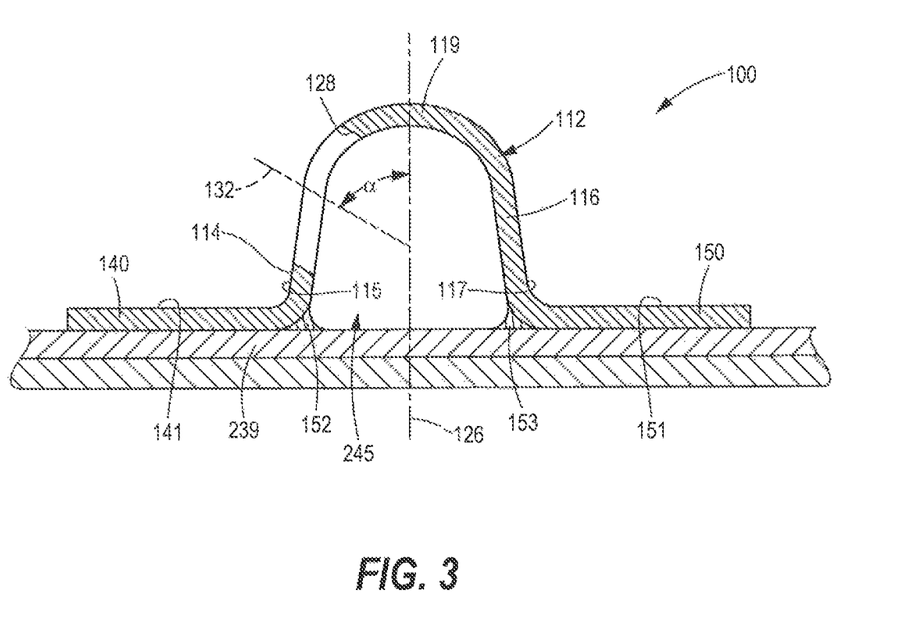
FIG. 3 is a schematic, elevation, sectional view of the vented hat stringer of FIG. 1, including a hat-stringer base wall, according to one or more examples of the subject matter, disclosed herein.
Figure 4:
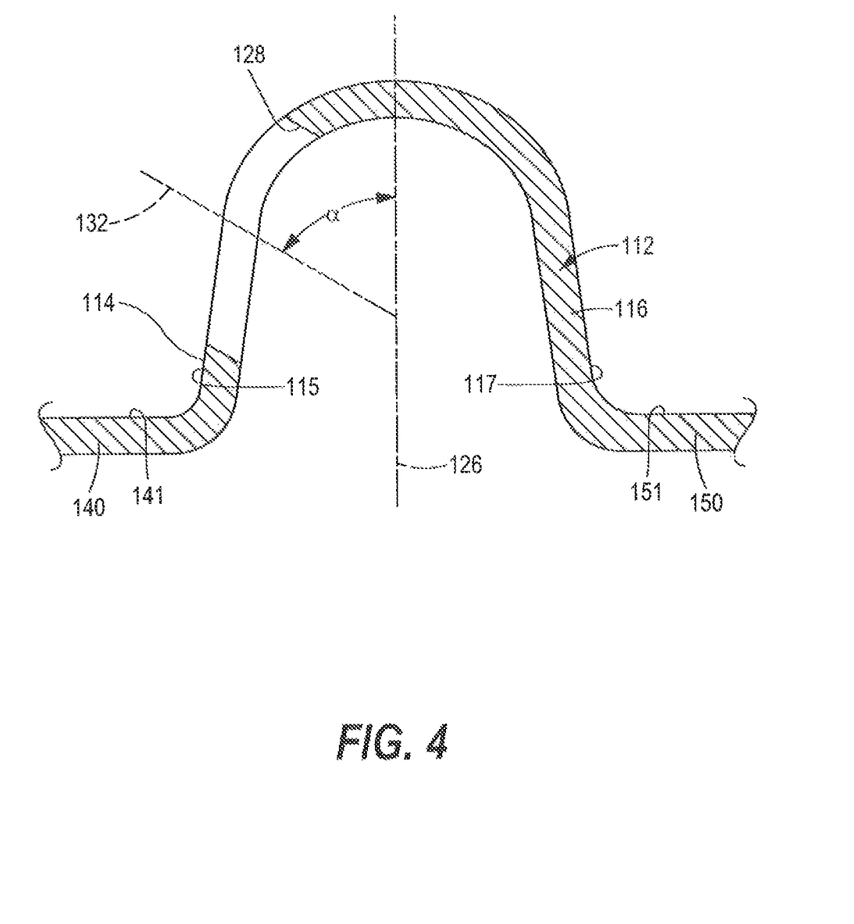
FIG. 4 is a schematic, elevation, sectional view of the vented hat stringer of FIG. 1, without a hat-stringer base wall, according to one or more examples of the subject matter, disclosed herein.

In one or more examples, when viewed in cross-section, as best shown in FIGS. 3 and 4, forming, with a planar configuration, first-hat-stringer-leg surface 141, second-hat-stringer-leg surface 151, first-hat-stringer-sidewall surface 115, and second hat-stringer-sidewall surface 117, and forming, with an arcuate configuration, hat-stringer-connecting-wall surface 119, provides a curved wall stringer having improved rigidity characteristics.

Referring generally to FIG. 1 and particularly to, e.g., FIGS. 3 and 4 for illustrative purposes only and not by way of limitation, the following portion of this paragraph delineates example 3 of the subject matter, disclosed herein. According to example 3, which encompasses examples 1 and 2, above, ventilation-opening centerline 132 intersects virtual hat-stringer-connecting-wall symmetry plane 126.

Providing ventilation opening 128 along ventilation-opening centerline 132 that intersects ventilation-opening centerline 132 ensures sufficient fluid flow from within hat-stringer connecting wall 112 to ventilation opening 128.

Referring generally to FIG. 1 and particularly to, e.g., FIGS. 3 and 4 for illustrative purposes only and not by way of limitation, the following portion of this paragraph delineates example 4 of the subject matter, disclosed herein. According to example 4, which encompasses example 3, above, ventilation-opening centerline 132 and virtual hat-stringer-connecting -wall symmetry plane 126 define therebetween ventilation-opening included angle a, which is less than 90°.

Providing an included angle a of less than 90° between virtual hat-stringer-connecting-wall symmetry plane 126 and ventilation-opening centerline 132 reduces the amount of space required to attach ancillary components to vented hat stringer 100.

Figure 9:
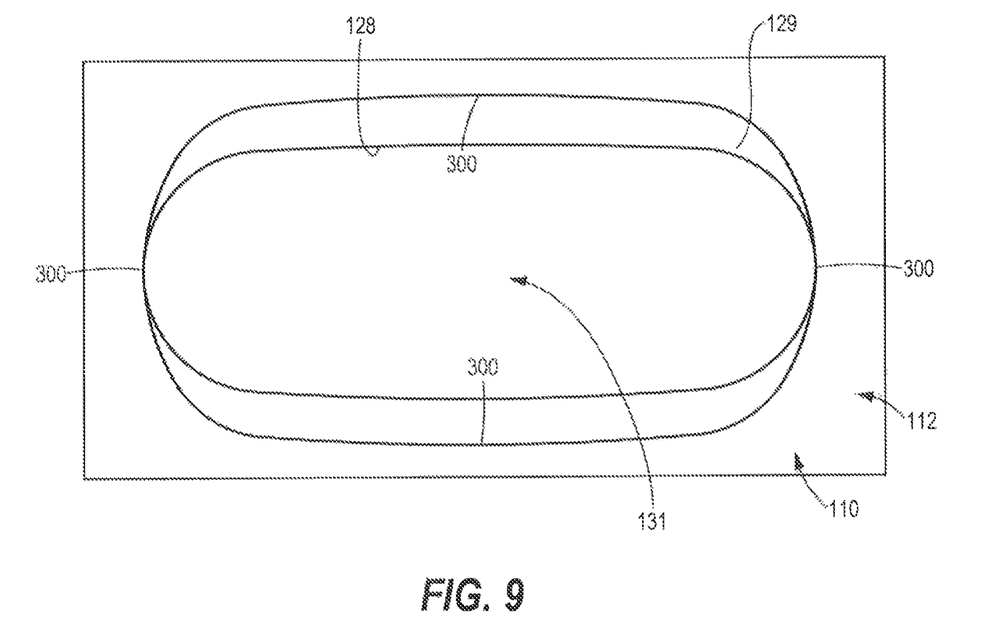
FIG. 9 is a schematic, top view of a ventilation opening of the vented hat stringer of FIG. 1, according to one or more examples of the subject matter, disclosed herein.
Figure 10:
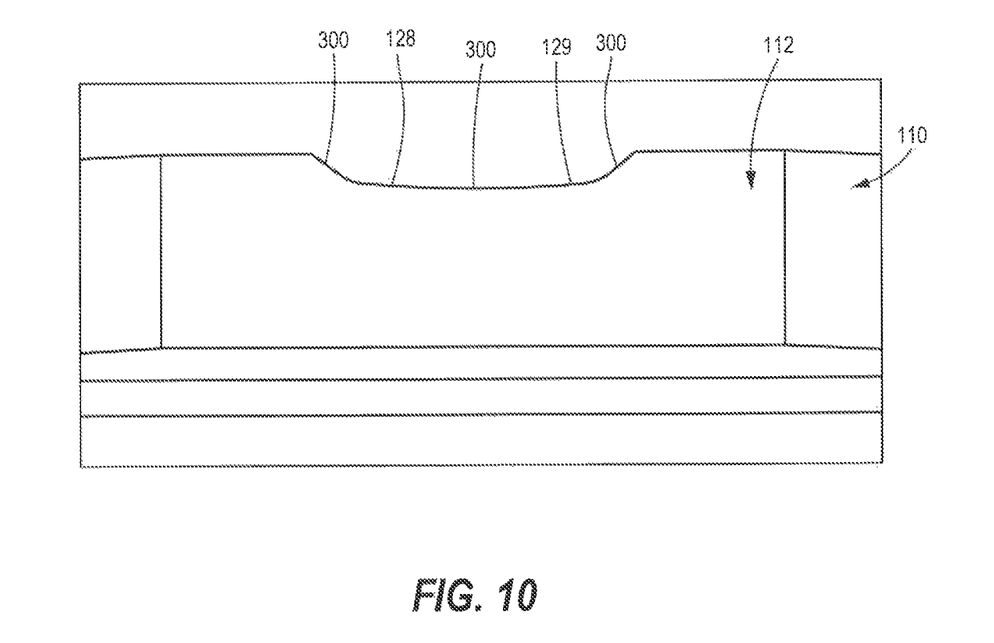
FIG. 10 is a schematic, elevation view of the ventilation opening of FIG. 9, according to one or more examples of the subject matter, disclosed herein.

Referring generally to FIG. 1 and particularly to, e.g., FIGS. 9 and 10 for illustrative purposes only and not by way of limitation, the following portion of this paragraph delineates example 5 of the subject matter, disclosed herein. According to example 5, which encompasses any one of examples 1 to 4, above, ventilation opening 128 comprises a circumferential edge 129, and circumferential edge 129 is curvilinear in its entirety.

Providing ventilation opening 128 with circumferential edge 129 that is curvilinear in its entirety reduces stress levels around ventilation opening 128. Consequently, less material is required to maintain strains below a desired level, and therefore rigidity is maintained as thickness and stress concentrations are reduced.

Referring generally to FIG. 1 and particularly to, e.g., FIGS. 9-12 for illustrative purposes only and not by way of limitation, the following portion of this paragraph delineates example 6 of the subject matter, disclosed herein. According to example 6, which encompasses example 5, above, ventilation opening 128 defines ventilation-opening centroid 131, and circumferential edge 129 comprises concave portions 300 when viewed from ventilation-opening centroid 131.

Providing circumferential edge 129 with concave portions 300, when viewed from ventilation-opening centroid 131, enables ventilation opening 128 to more uniformly transition to fitting 200.

Referring generally to FIG. 1 and particularly to, e.g., FIGS. 9 and 10 for illustrative purposes only and not by way of limitation, the following portion of this paragraph delineates example 7 of the subject matter, disclosed herein. According to example 7, which encompasses example 5, above, all portions of circumferential edge 129 are concave portions 300.

Providing all portions of circumferential edge 129 as concave portions reduces stress concentrations in hat stringer 110 near ventilation opening 128.

Figure 11:
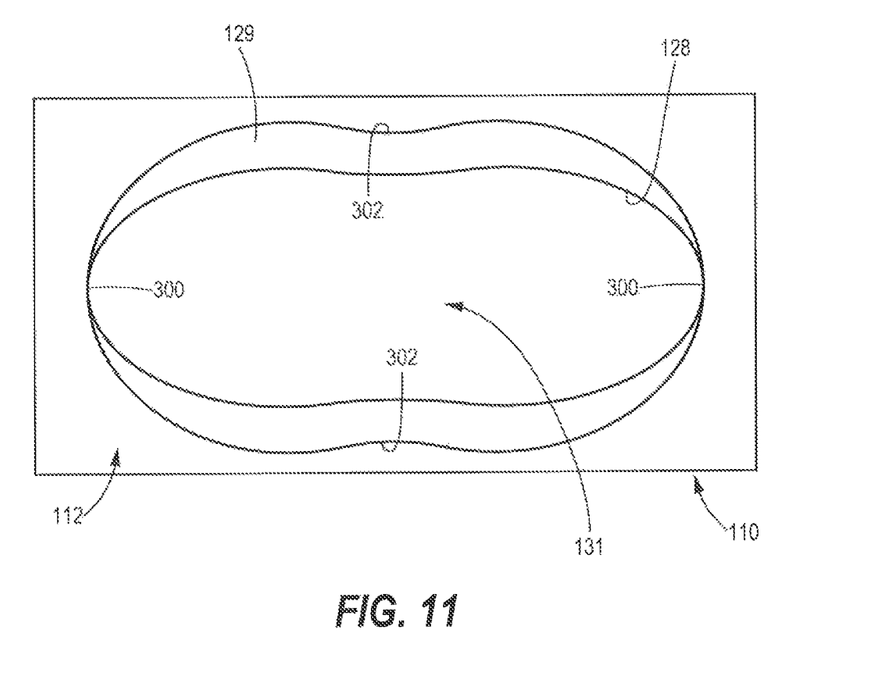
FIG. 11 is a schematic, top view of a ventilation opening of the vented hat stringer of FIG. 1, according to one or more examples of the subject matter, disclosed herein.
Figure 12:
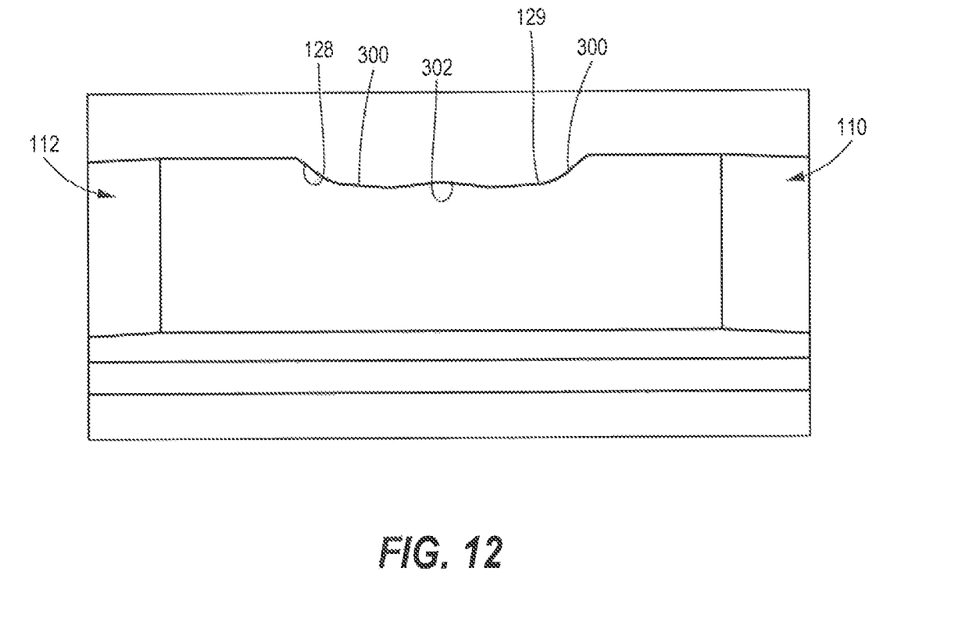
FIG. 12 is a schematic, elevation view of the ventilation opening of FIG. 11, according to one or more examples of the subject matter, disclosed herein.

Referring generally to FIG. 1 and particularly to, e.g., FIGS. 11 and 12 for illustrative purposes only and not by way of limitation, the following portion of this paragraph delineates example 8 of the subject matter, disclosed herein. According to example 8, which encompasses example 5, above, circumferential edge 129 comprises convex portions 302 when viewed from ventilation-opening centroid 131.

Providing circumferential edge 129 with both concave portions 300 and convex portions 302, when viewed from ventilation-opening centroid 131, enables additional mass from hat stringer 110 to be located around ventilation opening 128, thereby increasing rigidity of hat stringer 110 around ventilation opening 128.

Referring generally to FIG. 1 and particularly to, e.g., FIGS. 11 and 12 for illustrative purposes only and not by way of limitation, the following portion of this paragraph delineates example 9 of the subject matter, disclosed herein. According to example 9, which encompasses example 8, above, circumferential edge 129 further comprises two concave portions 300, joined together by convex portion 302.

Providing circumferential edge 129 with two concave portions 300 joined together by a convex portion 302, enables additional mass from hat stringer 110 to be located around ventilation opening 128 while reducing stress concentrations in hat stringer 110 near ventilation opening 128.

Referring generally to FIG. 1 and particularly to, e.g., FIGS. 2-3 and 5-8 for illustrative purposes only and not by way of limitation, the following portion of this paragraph delineates example 10 of the subject matter, disclosed herein. According to example 10, which encompasses any one of examples 1 to 9, above, vented hat stringer 100 further comprises hat-stringer base wall 239, coupled to first hat-stringer leg 140 and to second hat-stringer leg 150.

Providing hat-stringer base wall 239 coupled to first hat-stringer leg 140 and to second hat-stringer leg 150 facilitates fabrication of vented hat stringer 100 as a unitary component, having improved rigidity, prior to installation on a primary structure, such as an aircraft.

In one or more examples, vented hat stringer 100 includes hat-stringer base wall 239. With hat-stringer base wall 239, vented hat stringer 100 is stronger and less subject to damage during transport and installation. When installed, hat-stringer base wall 239 contacts the component, supported by vented hat stringer 100. In one or more examples where vented hat stringer 100 doesn't comprise hat-stringer base wall 239, first hat-stringer leg 140 and second hat-stringer leg 150 directly contact the component being supported by vented hat stringer 100.

Referring generally to FIG. 1 and particularly to, e.g., FIGS. 2-3 and 5-8 for illustrative purposes only and not by way of limitation, the following portion of this paragraph delineates example 11 of the subject matter, disclosed herein. According to example 11, which encompasses example 10, above, hat-stringer base wall 239 extends from first hat-stringer leg 140 to second hat-stringer leg 150.

By extending from first hat-stringer leg 140 to second hat-stringer leg 150, hat-stringer base wall 239 further increases the rigidity of vented hat stringer 100 when formed as a unitary component, prior to installation on a component to be supported by vented hat stringer 100.

Referring generally to FIG. 1 and particularly to, e.g., FIGS. 2, 3, 5, 6, and 8 for illustrative purposes only and not by way of limitation, the following portion of this paragraph delineates example 12 of the subject matter, disclosed herein. According to example 12, which encompasses example 11, above, vented hat stringer 100 further comprises hat-stringer cavity 245, which is in fluidic communication with ventilation opening 128. First hat-stringer sidewall 114, hat-stringer connecting wall 112, second hat-stringer sidewall 116, and a portion of hat-stringer base wall 239 form at least a portion of hat-stringer cavity 245.

Providing hat-stringer cavity 245 expands the functionality of vented hat stringer 100 to enable fluid flow therethrough. For example, when vented hat stringer 100 is disposed in a wing of an aircraft, hat-stringer cavity 245 can be used to vent gases from fuel stored in the wing. As used herein, "fluidic" means of or pertaining to a fluid. Accordingly, hat-stringer cavity 245 being in fluidic communication with ventilation opening 128 means hat-stringer cavity 245 and ventilation opening 128 are configured so that fluid can travel between the two.

Figure 6:
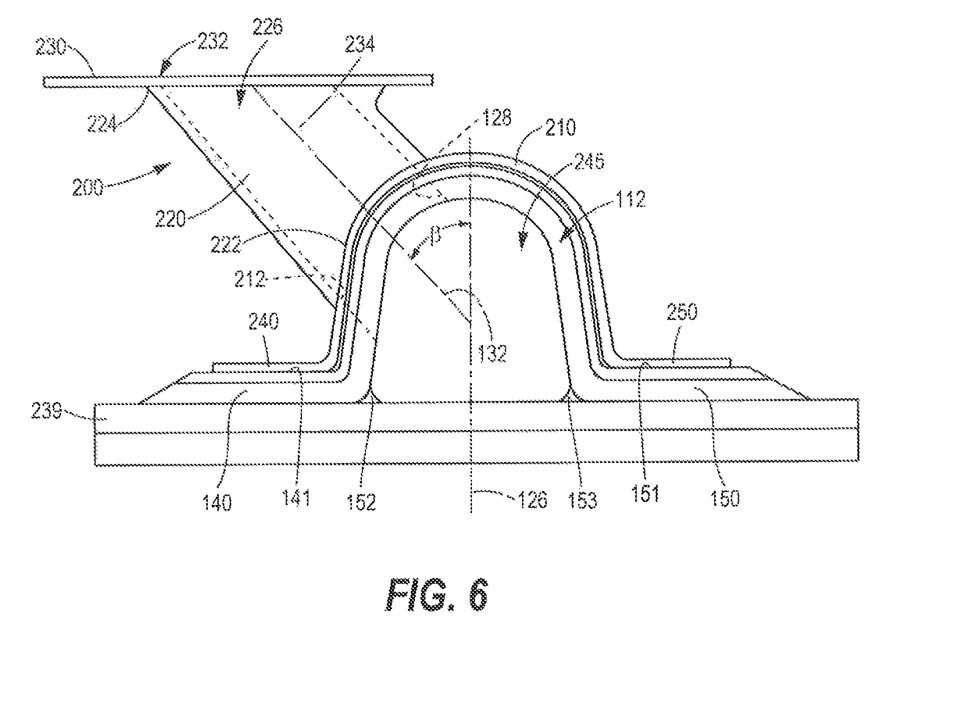
FIG. 6 is a schematic, elevation view of the vented hat stringer of FIG. 1, with a fitting attached, according to one or more examples of the subject matter, disclosed herein.
Figure 8:
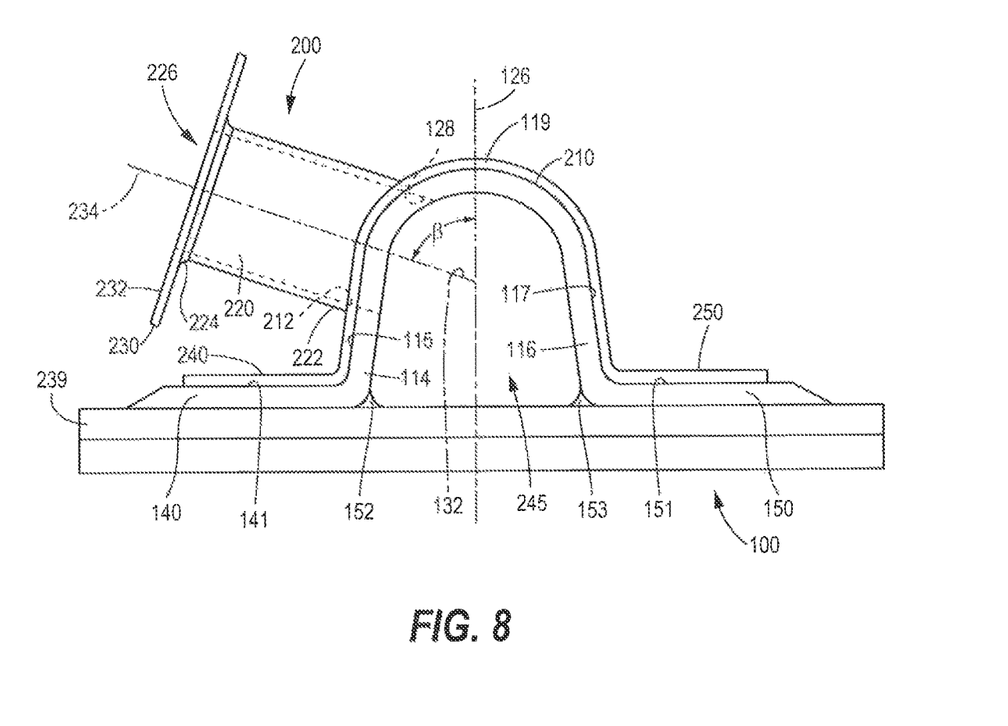
FIG. 8 is a schematic, elevation view of the vented hat stringer of FIG. 1, with a fitting attached, according to one or more examples of the subject matter, disclosed herein.

Referring generally to FIG. 1 and particularly to, e.g., FIGS. 3, 6, and 8 for illustrative purposes only and not by way of limitation, the following portion of this paragraph delineates example 13 of the subject matter, disclosed herein. According to example 13, which encompasses example 11 or 12, above, vented hat stringer 100 further comprises first noodle 152, which is in contact with first hat-stringer sidewall 114 and with hat-stringer base wall 239.

Providing first noodle 152 in contact with first hat-stringer sidewall 114 and hat-stringer base wall 239 reduces stress concentrations between first hat-stringer sidewall 114 and hat-stringer base wall 239, thereby increasing rigidity of vented hat stringer 100. As used herein, a "noodle" is a filler structure, typically formed of a composite material. The noodle can be placed in an area or channel extending along a length of a stringer or other type of elongate member, as is generally understood in the art.

Referring generally to FIG. 1 and particularly to, e.g., FIGS. 3, 6, and 8 for illustrative purposes only and not by way of limitation, the following portion of this paragraph delineates example 14 of the subject matter, disclosed herein. According to example 14, which encompasses example 13, above, vented hat stringer 100 further comprises second noodle 153, which is in contact with second hat-stringer sidewall 116 and with hat-stringer base wall 239.

Providing second noodle 153 in contact with second hat-stringer sidewall 116 and hat-stringer base wall 239 reduces stress concentrations between second hat-stringer sidewall 116 and hat-stringer base wall 239, thereby increasing rigidity of vented hat stringer 100.

Figure 7:
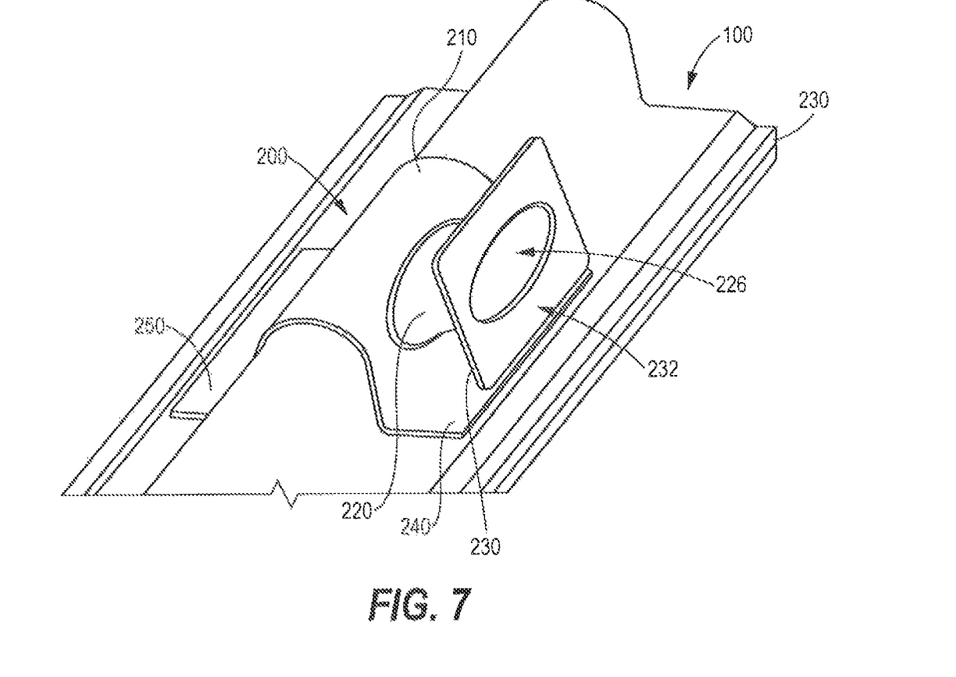
FIG. 7 is a schematic, perspective view of the vented hat stringer of FIG. 1, with a fitting attached, according to one or more examples of the subject matter, disclosed herein.

Referring generally to FIG. 1 and particularly to, e.g., FIGS. 6-8 for illustrative purposes only and not by way of limitation, the following portion of this paragraph delineates example 15of the subject matter, disclosed herein. According to example 15, which encompasses any one of examples 1 to 14, above, vented hat stringer 100 further comprises fitting 200 that comprises fitting connecting wall 210, which is in contact with hat-stringer connecting wall 112 and which comprises fitting opening 212 that extends through fitting connecting wall 210 and is in fluidic communication with ventilation opening 128. Fitting 200 also comprises fitting duct 220, comprising outboard duct end 222 that is coupled to fitting connecting wall 210, and inboard duct end 224 that is spaced away from fitting connecting wall 210. Fitting duct 220 defines duct passage 226, which is in fluidic communication with fitting opening 212. Fitting 200 further comprises fitting interface 230, coupled to inboard duct end 224 of fitting duct 220.

Providing fitting 200 facilitates coupling of vented hat stringer 100 to ancillary components, such as a vent valve. Fitting 200 has fitting connecting wall 210 that closely fits over hat-stringer connecting wall 112 and has fitting opening 212 in fluidic communication with ventilation opening 128 of vented hat stringer 100, thereby to increase torque resistance of vented hat stringer 100 around ventilation opening 128. Fitting duct 220 permits fluid flow therethrough, while fitting interface 230 facilitates coupling of an ancillary component to fitting 200. In one or more examples, fitting 200 facilitates attachment of a vent valve (not shown) to vented hat stringer 100.

Referring generally to FIG. 1 for illustrative purposes only and not by way of limitation, the following portion of this paragraph delineates example 16 of the subject matter, disclosed herein. According to example 16, which encompasses example 15, above, duct passage 226 extends along duct axis 234, which is a central axis of duct passage 226 and which intersects virtual hat-stringer-connecting-wall symmetry plane 126. Duct axis 234 is oblique to virtual hat-stringer-connecting-wall symmetry plane 126.

Providing duct passage 226 along duct axis 234 that intersects and is oblique to virtual hat-stringer-connecting-wall symmetry plane 126 reduces a pressure drop in fluid flowing from vented hat stringer 100 to fitting 200.

Referring generally to FIG. 1 and particularly to, e.g., FIGS. 6-8 for illustrative purposes only and not by way of limitation, the following portion of this paragraph delineates example 17 of the subject matter, disclosed herein. According to example 17, which encompasses example 16, above, duct axis 234 and virtual hat-stringer-connecting-wall symmetry plane 126 define therebetween a duct-axis included angle β, which is less than 90°.

Providing duct axis 234 at duct-axis included angle β of less than 90° relative to virtual hat-stringer-connecting-wall symmetry plane 126 ensures a minimal pressure drop in fluid flowing from vented hat stringer 100 to fitting 200. In one or more example, included angle β is the same included angle α. In one or more examples, included angle β is different from included angle a.

Referring generally to FIG. 1 and particularly to, e.g., FIGS. 7 and 8 for illustrative purposes only and not by way of limitation, the following portion of this paragraph delineates example 18 of the subject matter, disclosed herein. According to example 18, which encompasses example 16 or 17, above, fitting interface 230 comprises interface surface 232, perpendicular to duct axis 234.

Providing interface surface 232 on fitting interface 230 facilitates coupling of an ancillary component to fitting 200. Providing interface surface 232 perpendicular to duct axis 234 permits an ancillary component to be located to a side of vented hat stringer 100, thereby facilitating use in environments having limited space directly inboard of vented hat stringer 100.

Referring generally to FIG. 1 and particularly to, e.g., FIG. 6 for illustrative purposes only and not by way of limitation, the following portion of this paragraph delineates example 19 of the subject matter, disclosed herein. According to example 19, which encompasses example 16 or 17, above, fitting interface 230 comprises interface surface 232, oblique to duct axis 234.

Providing interface surface 232 on fitting interface 230 facilitates coupling of an ancillary component to fitting 200. Providing interface surface 232 oblique to duct axis 234 further adapts vented hat stringer 100 for use in environments having limited space.

Referring generally to FIG. 1 and particularly to, e.g., FIGS. 6-8 for illustrative purposes only and not by way of limitation, the following portion of this paragraph delineates example 20 of the subject matter, disclosed herein. According to example 20, which encompasses any one of examples 15 to 19, above, fitting 200 further comprises first fitting base leg 240, which is in contact with first hat-stringer leg 140, and second fitting base leg 250, which is in contact with second hat-stringer leg 150.

In one or more examples, providing fitting 200 with first fitting base leg 240 that is in contact with first hat-stringer leg 140 and second fitting base leg 250 that is in contact with second hat-stringer leg 150 improves rigidity of vented hat stringer 100 adjacent ventilation opening 128.

Figure 2:
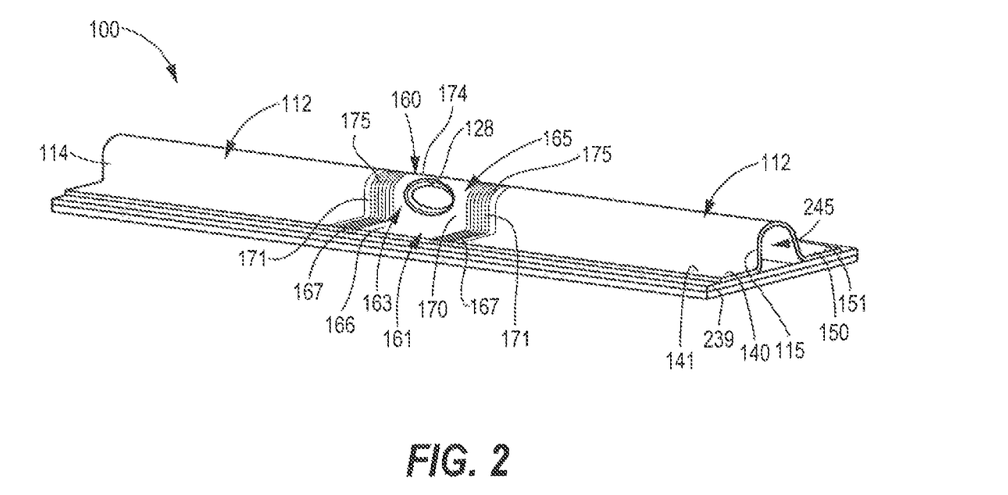
FIG. 2 is a schematic, perspective view of the vented hat stringer of FIG. 1, including a hat-stringer base wall, according to one or more examples of the subject matter, disclosed herein.
Figure 5:
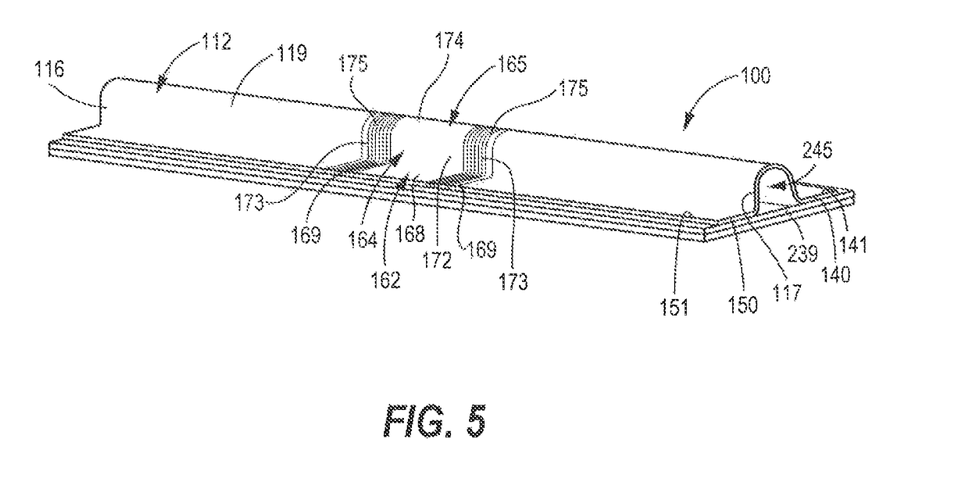
FIG. 5 is a schematic, perspective view of the vented hat stringer of FIG. 1, according to one or more examples of the subject matter, disclosed herein.

Referring generally to FIG. 1 and particularly to, e.g., FIGS. 2 and 5 for illustrative purposes only and not by way of limitation, the following portion of this paragraph delineates example 21 of the subject matter, disclosed herein. According to example 21, which encompasses any one of examples 1 to 20, above, vented hat stringer 100 further comprises reinforcement 160, surrounding ventilation opening 128.

Providing reinforcement 160 surrounding ventilation opening 128 improves rigidity and torque resistance of vented hat stringer 100.

Referring generally to FIG. 1 and particularly to, e.g., FIGS. 2 and 5 for illustrative purposes only and not by way of limitation, the following portion of this paragraph delineates example 22 of the subject matter, disclosed herein. According to example 22, which encompasses example 21, above, reinforcement 160 comprises a plurality of plies of composite material.

Forming reinforcement 160 from a plurality of plies of composite material enables reinforcement 160 to be closely coupled to hat-stringer connecting wall 112, thereby increasing the amount of rigidity supplied by reinforcement 160 to hat-stringer connecting wall 112.

Referring generally to FIG. 1 and particularly to, e.g., FIGS. 2 and 5 for illustrative purposes only and not by way of limitation, the following portion of this paragraph delineates example 23 of the subject matter, disclosed herein. According to example 23, which encompasses example 21 or 22, above, reinforcement 160 comprises first reinforcement base leg 161, coupled to first hat-stringer leg 140, second reinforcement base leg 162, coupled to second hat-stringer leg 150, first reinforcement sidewall 163, coupled to first hat-stringer sidewall 114, second reinforcement sidewall 164, coupled to second hat-stringer sidewall 116, and reinforcement connection wall 165, coupled to hat-stringer connecting wall 112.

Providing reinforcement 160 with first reinforcement base leg 161 coupled to first hat-stringer leg 140, second reinforcement base leg 162 coupled to second hat-stringer leg 150, first reinforcement sidewall 163 coupled to first hat-stringer sidewall 114, second reinforcement sidewall 164 coupled to second hat-stringer sidewall 116, and reinforcement connection wall 165 coupled to hat-stringer connecting wall 112, expands the area across which reinforcement 160 is coupled to vented hat stringer 100, thereby increasing the amount of rigidity supplied by reinforcement 160 to vented hat stringer 100.

Referring generally to FIG. 1 and particularly to, e.g., FIG. 2 for illustrative purposes only and not by way of limitation, the following portion of this paragraph delineates example 24 of the subject matter, disclosed herein. According to example 24, which encompasses example 23, above, first reinforcement base leg 161 comprises first-reinforcement-base-leg central portion 166 and two first-reinforcement-base-leg tapered portions 167, extending from first-reinforcement-base-leg central portion 166 in opposite directions. First-reinforcement-base-leg central portion 166 has a uniform thickness.

Providing first reinforcement base leg 161 with first-reinforcement-base-leg central portion 166 having a uniform thickness and two first-reinforcement-base-leg tapered portions 167 of non-uniform thickness reduces stress concentrations between first reinforcement base leg 161 and first hat-stringer leg 140, while reducing weight of first reinforcement base leg 161. In some examples, first reinforcement base leg 161 is formed of a plurality of plies of composite material, and first-reinforcement-base-leg tapered portions 167 are formed by successively shorter length plies of composite material layered on top of each other. Alternatively, in one or more examples, first reinforcement base leg 161 is formed of a plurality of plies of composite material, and first-reinforcement-base-leg tapered portions 167 are formed by successively longer length plies of composite material layered on top of each other. Still further, in one or more examples, first reinforcement base leg 161 is formed of a plurality of plies of composite material, and first-reinforcement-base-leg tapered portions 167 are formed by interleafed plies of composite material.

Referring generally to FIG. 1 and particularly to, e.g., FIG. 5 for illustrative purposes only and not by way of limitation, the following portion of this paragraph delineates example 25 of the subject matter, disclosed herein. According to example 25, which encompasses example 24, above, second reinforcement base leg 162 comprises second-reinforcement-base-leg central portion 168 and two second-reinforcement-base-leg tapered portions 169, extending from second-reinforcement-base-leg central portion 168 in opposite directions. Second-reinforcement-base-leg central portion 168 has a uniform thickness.

Providing second reinforcement base leg 162 with second-reinforcement-base-leg central portion 168 having a uniform thickness and second-reinforcement-base-leg tapered portions 169 of non-uniform thickness reduces stress concentrations between second reinforcement base leg 162 and second hat-stringer leg 150, while reducing weight of second reinforcement base leg 162. In some examples, second reinforcement base leg 162 is formed of a plurality of plies of composite material, and second-reinforcement-base-leg tapered portions 169 are formed by successively shorter length plies of composite material layered on top of each other. Alternatively, in one or more examples, second reinforcement base leg 162 is formed of a plurality of plies of composite material, and second-reinforcement-base-leg tapered portions 169 are formed by successively longer length plies of composite material layered on top of each other. Still further, in one or more examples, second reinforcement base leg 162 is formed of a plurality of plies of composite material, and second-reinforcement-base-leg tapered portions 169 are formed by interleafed plies of composite material.

Referring generally to FIG. 1 and particularly to, e.g., FIG. 2 for illustrative purposes only and not by way of limitation, the following portion of this paragraph delineates example 26 of the subject matter, disclosed herein. According to example 26, which encompasses example 25, above, first reinforcement sidewall 163 comprises first-reinforcement-sidewall central portion 170 and two first-reinforcement-sidewall tapered portions 171, extending from first-reinforcement-sidewall central portion 170 in opposite directions. First-reinforcement-sidewall central portion 170 has a uniform thickness.

Providing first reinforcement sidewall 163 with first-reinforcement-sidewall central portion 170 having a uniform thickness and two first-reinforcement-sidewall tapered portions 171 of non-uniform thickness reduces stress concentrations between first reinforcement sidewall 163 and first hat-stringer sidewall 114, while reducing weight of first reinforcement sidewall 163. In one or more examples, first reinforcement sidewall 163 is formed of a plurality of plies of composite material, and first-reinforcement-sidewall tapered portions 171 are formed by successively shorter length plies of composite material layered on top of each other. Alternatively, in one or more examples, first reinforcement sidewall 163 is formed of a plurality of plies of composite material, and first-reinforcement-sidewall tapered portions 171 are formed by successively longer length plies of composite material layered on top of each other. Still further, in one or more examples, first reinforcement sidewall 163 is formed of a plurality of plies of composite material, and first-reinforcement-sidewall tapered portions 171 are formed by interleafed plies of composite material.

Referring generally to FIG. 1 and particularly to, e.g., FIG. 5 for illustrative purposes only and not by way of limitation, the following portion of this paragraph delineates example 27 of the subject matter, disclosed herein. According to example 27, which encompasses example 26, above, second reinforcement sidewall 164 comprises second-reinforcement-sidewall central portion 172 and two second-reinforcement-sidewall tapered portions 173, extending from second-reinforcement-sidewall central portion 172 in opposite directions. Second-reinforcement-sidewall central portion 172 has a uniform thickness.

Providing second reinforcement sidewall 164 with second-reinforcement-sidewall central portion 172 having a uniform thickness and two second-reinforcement-sidewall tapered portions 173 of non-uniform thickness reduces stress concentrations between second reinforcement sidewall 164 and second hat-stringer sidewall 116, while reducing weight of second reinforcement sidewall 164. In some examples, second reinforcement sidewall 164 is formed of a plurality of plies of composite material, and second-reinforcement-sidewall tapered portions 173 are formed by successively shorter length plies of composite material layered on top of each other. Alternatively, in one or more examples, second reinforcement sidewall 164 is formed of a plurality of plies of composite material, and second-reinforcement-sidewall tapered portions 173 are formed by successively longer length plies of composite material layered on top of each other. Still further, in one or more examples, second reinforcement sidewall 164 is formed of a plurality of plies of composite material, and second-reinforcement-sidewall tapered portions 173 are formed by interleafed plies of composite material.

Referring generally to FIG. 1 and particularly to, e.g., FIGS. 2 and 5 for illustrative purposes only and not by way of limitation, the following portion of this paragraph delineates example 28 of the subject matter, disclosed herein. According to example 28, which encompasses example 27, above, reinforcement connection wall 165 comprises reinforcement-connecting-wall central portion 174 and two reinforcement-connecting-wall tapered portions 175, extending from reinforcement-connecting-wall central portion 174 in opposite directions. Reinforcement-connecting-wall central portion 174 has a uniform thickness.

Providing reinforcement connection wall 165 with reinforcement-connecting-wall central portion 174 having a uniform thickness and two reinforcement-connecting-wall tapered portions 175 of non-uniform thickness reduces stress concentrations between reinforcement connection wall 165 and hat-stringer connecting wall 112, while reducing weight of reinforcement connection wall 165. In some examples, reinforcement connection wall 165 is formed of a plurality of plies of composite material, and two reinforcement-connecting-wall tapered portions 175 are formed by successively shorter length plies of composite material layered on top of each other. Alternatively, in one or more examples, reinforcement connection wall 165 is formed of a plurality of plies of composite material, and reinforcement-connecting-wall tapered portions 175 are formed by successively longer length plies of composite material layered on top of each other. Still further, in one or more examples, reinforcement connection wall 165 is formed of a plurality of plies of composite material, and reinforcement-connecting-wall tapered portions 175 are formed by interleafed plies of composite material.

Referring generally to FIG. 1 and particularly to, e.g., FIGS. 1-8 for illustrative purposes only and not by way of limitation, the following portion of this paragraph delineates example 29 of the subject matter, disclosed herein. According to example 29, which encompasses any one of examples 1 to 28, above, each of hat-stringer connecting wall 112, first hat-stringer sidewall 114, second hat-stringer sidewall 116, first hat-stringer leg 140, and second hat-stringer leg 150 comprises a plurality of plies of composite material.

Forming each of hat-stringer connecting wall 112, first hat-stringer sidewall 114, second hat-stringer sidewall 116, first hat-stringer leg 140, and second hat-stringer leg 150 from a plurality of plies of composite material facilitates easy and less expensive fabrication of vented hat stringer 100.

Referring generally to FIG. 1 and particularly to, e.g., FIGS. 1-8 for illustrative purposes only and not by way of limitation, the following portion of this paragraph delineates example 30 of the subject matter, disclosed herein. According to example 30, which encompasses example 29, above, the plurality of plies of composite material that form hat-stringer connecting wall 112, first hat-stringer sidewall 114, second hat-stringer sidewall 116, first hat-stringer leg 140, and second hat-stringer leg 150 are co-cured together.

Co-curing hat-stringer connecting wall 112, first hat-stringer sidewall 114, second hat-stringer sidewall 116, first hat-stringer leg 140, and second hat-stringer leg 150 together improves rigidity of vented hat stringer 100.

In one or more examples, co-curing comprises placing uncured plies of composite material in a lay-up tool. A flexible bladder, which in some examples comprises a hollow bladder, is placed into the trough, over the composite material. A vacuum bag is then placed over the bladder and composite material and sealed to the lay-up tool. Vacuum and heat via an autoclave are applied to co-cure the composite material.

Referring generally to FIG. 13 and particularly to, e.g., FIGS. 1-6 for illustrative purposes only and not by way of limitation, the following portion of this paragraph delineates example 31 of the subject matter, disclosed herein. According to example 31, method 400 of forming vented hat stringer 100 of any one of examples 1 to 30, above, comprises steps of (block 402) forming each of first hat-stringer leg 140, second hat-stringer leg 150, first hat-stringer sidewall 114, hat-stringer connecting wall 112, and second hat-stringer sidewall 116 from a plurality of plies of composite material such that virtual hat-stringer-connecting-wall symmetry plane 126 does not intersect ventilation opening 128.

Forming each of first hat-stringer leg 140, second hat-stringer leg 150, first hat-stringer sidewall 114, second hat-stringer sidewall 116, and hat-stringer connecting wall 112 from a plurality of plies of composite material enables fabrication of vented hat stringer 100 using the same manufacturing techniques, thereby reducing fabrication time and expense. Forming vented hat stringer 100 such that virtual hat-stringer-connecting-wall symmetry plane 126 does not intersect ventilation opening 128 increases the amount of mass of vented hat stringer 100 located in hat-stringer connecting wall 112, thereby increasing stiffness and rigidity.

In one or more examples, first hat-stringer leg 140, second hat-stringer leg 150, first hat-stringer sidewall 114, hat-stringer connecting wall 112, and second hat-stringer sidewall 116 are formed from the same plurality of plies of composite material, which are stacked on top of each other. In further examples, ventilation opening 128 is formed in each of the plurality of plies of composite material prior to stacking the plurality of plies of composite material on top of each other. In one or more examples, ventilation opening 128 is formed after the plurality of plies of composite material are stacked, such as by drilling or cutting through the stacked plurality of plies of composite material.

Referring generally to FIG. 13 and particularly to, e.g., FIGS. 1-6 for illustrative purposes only and not by way of limitation, the following portion of this paragraph delineates example 32 of the subject matter, disclosed herein. According to example 32, which encompasses example 31, above, method 400 further comprises the step of (block 404) co-curing together the plurality of plies forming first hat-stringer leg 140, second hat-stringer leg 150, first hat-stringer sidewall 114, hat-stringer connecting wall 112, and second hat-stringer sidewall 116.

Co-curing the plurality of plies of composite material that form first hat-stringer leg 140, second hat-stringer leg 150, first hat-stringer sidewall 114, hat-stringer connecting wall 112, and second hat-stringer sidewall 116 results in vented hat stringer 100 with improved integrity and rigidity.

Referring generally to FIG. 13 and particularly to, e.g., FIGS. 1-8 for illustrative purposes only and not by way of limitation, the following portion of this paragraph delineates example 33 of the subject matter, disclosed herein. According to example 33, which encompasses example 31, above, method 400 further comprises, the step of (block 406) coupling fitting 200 to vented hat stringer 100. Fitting 200 comprises fitting connecting wall 210 that is in contact with hat-stringer connecting wall 112 and that comprises fitting opening 212, which extends through fitting connecting wall 210 and which is in fluidic communication with ventilation opening 128. Fitting 200 also comprises fitting duct 220, comprising outboard duct end 222 that is coupled to fitting connecting wall 210, and inboard duct end 224 that is spaced away from fitting connecting wall 210, wherein fitting duct 220 defines duct passage 226 that is in fluidic communication with fitting opening 212. Fitting 200 further comprises fitting interface 230, coupled to inboard duct end 224 of fitting duct 220.

Providing fitting 200 facilitates coupling of vented hat stringer 100 to ancillary components, such as a vent valve. Fitting 200 has fitting connecting wall 210 that closely fits over hat-stringer connecting wall 112 and has fitting opening 212 in fluidic communication with ventilation opening 128 of vented hat stringer 100, thereby to increase torque resistance of vented hat stringer 100 around ventilation opening 128. Fitting duct 220 permits fluid flow therethrough, while fitting interface 230 facilitates coupling of an ancillary component to fitting 200.

Referring generally to FIG. 1 and particularly to, e.g., FIGS. 1-5 and 15 for illustrative purposes only and not by way of limitation, the following portion of this paragraph delineates example 34 of the subject matter, disclosed herein. According to example 34, aircraft 1102 comprises skin portion 1150, comprising inner side 1152. Aircraft 1102 also comprises vented hat stringer 100, according to any one of examples 1 to 30, above. Vented hat stringer 100 is coupled to inner side 1152 of skin portion 1150.

Vented hat stringer 100 provides advantages when used on aircraft 1102. Vented hat stringer 100 reinforces skin portion 1150 of aircraft 1102, enabling skin portion 1150 to be made from a thinner material and reducing overall weight of aircraft 1102. Additionally, providing vented hat stringer 100, having hat-stringer connecting wall 112 defining virtual hat-stringer-connecting-wall symmetry plane 126, with ventilation opening 128 defining ventilation-opening centerline 132, wherein ventilation-opening centerline 132 does not coincide with virtual hat-stringer-connecting-wall symmetry plane 126, improves the rigidity of vented hat stringer 100, thereby improving the support strength of vented hat stringer 100 without increasing weight of vented hat stringer 100.

Figure 14:
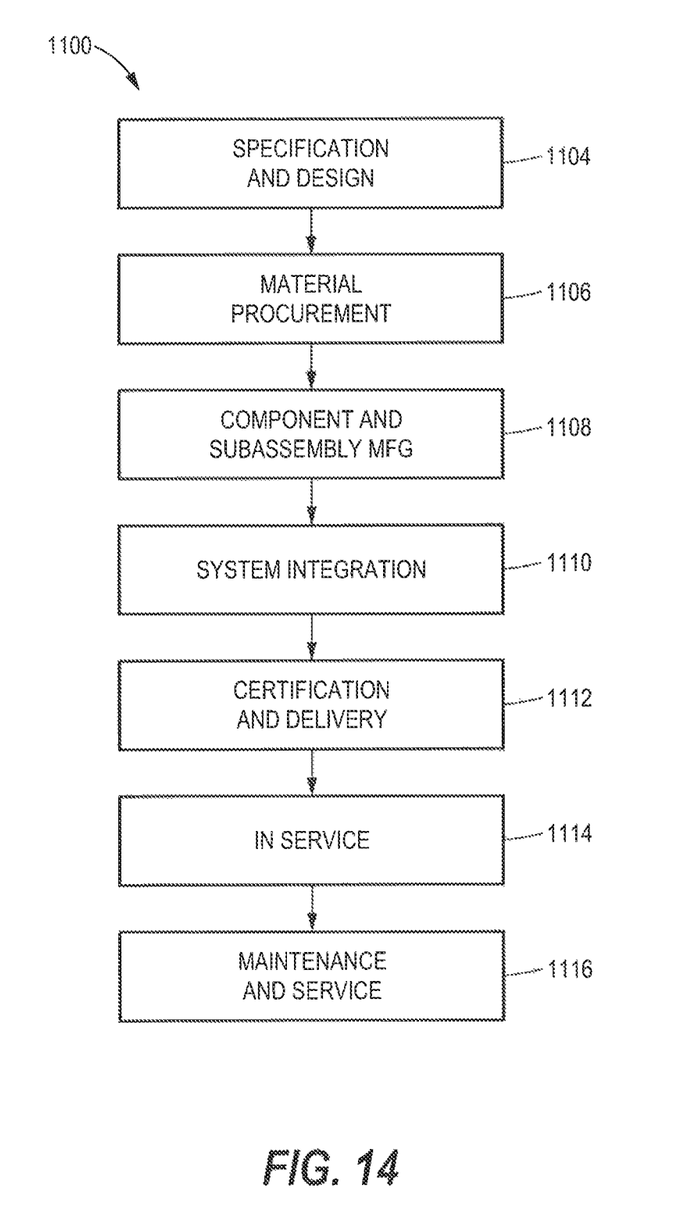
FIG. 14 is a block diagram of aircraft production and service methodology.
Figure 15:
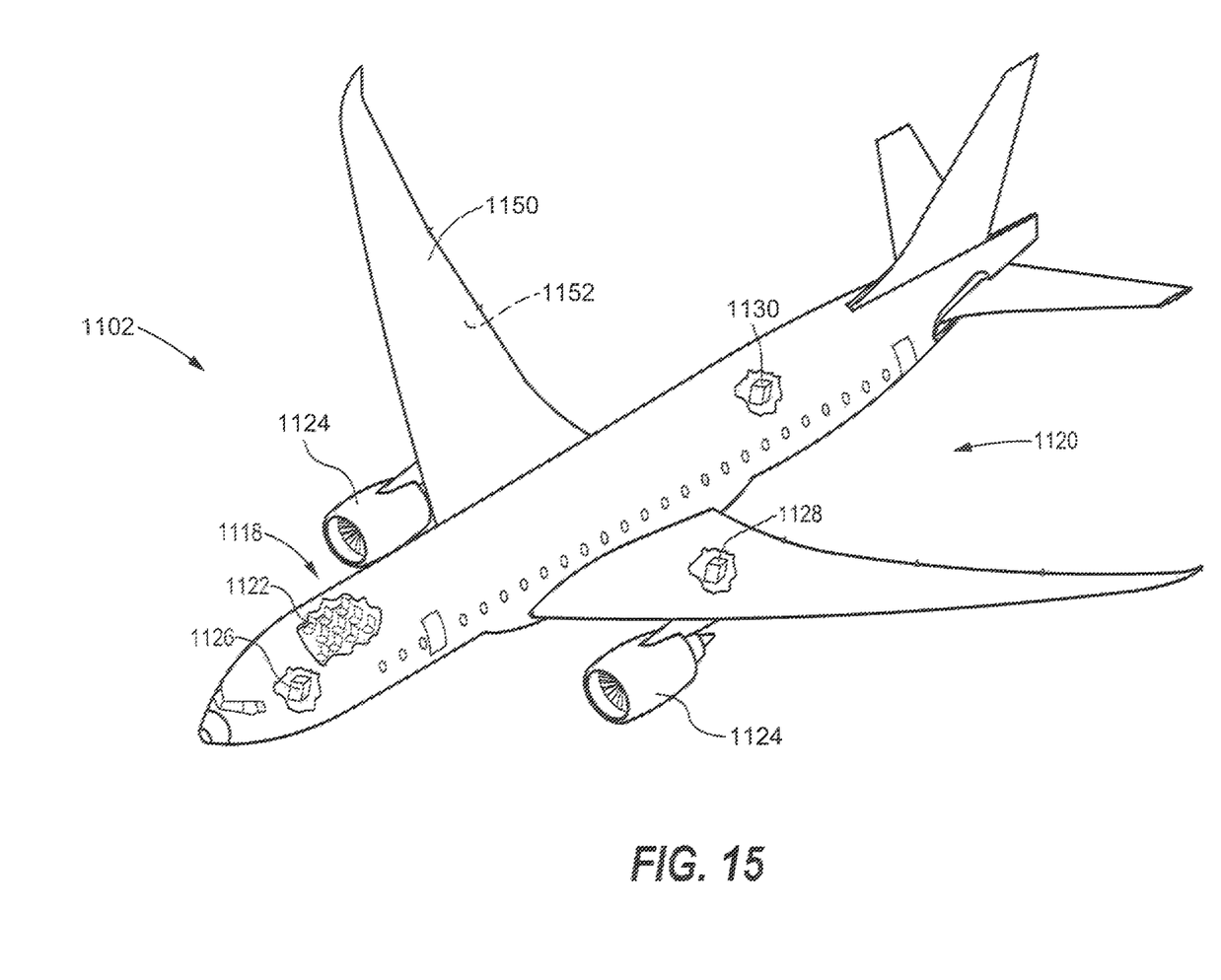
FIG. 15 is a schematic illustration of an aircraft.

Examples of the subject matter, disclosed herein may be described in the context of aircraft manufacturing and service method 1100 as shown in FIG. 14 and aircraft 1102 as shown in FIG. 15. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 15, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus(es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

What is claimed is:

1. A vented hat stringer, comprising:
a first hat-stringer leg that comprises a first-hat-stringer-leg surface;
a second hat-stringer leg that comprises a second-hat-stringer-leg surface, wherein the second hat-stringer leg is spaced apart from the first hat-stringer leg;
a first hat-stringer sidewall, comprising a first-hat-stringer-sidewall surface that extends from the first-hat-stringer-leg surface, wherein the first hat-stringer sidewall is planar;
a hat-stringer connecting wall, comprising a hat-stringer-connecting-wall surface, extending from the first-hat-stringer-leg surface, and a virtual hat-stringer-connecting-wall symmetry plane, passing through the hat-stringer-connecting-wall surface, wherein the hat-stringer connecting wall is arcuate;
a second hat-stringer sidewall, comprising a second-hat-stringer-sidewall surface that extends from the hat-stringer-connecting-wall surface to the second-hat-stringer-leg surface; and
a ventilation opening, spanning the first hat-stringer sidewall and the hat-stringer connecting wall, the ventilation opening defining a ventilation-opening centerline, wherein the ventilation-opening centerline does not coincide with the virtual hat-stringer-connecting-wall symmetry plane.

2. The vented hat stringer according to claim 1, wherein:
the first-hat-stringer-leg surface is planar;
the second-hat-stringer-leg surface is planar;
the first-hat-stringer-leg surface and the second-hat-stringer-leg surface are co-planar;
the first-hat-stringer-sidewall surface is planar, wherein the first-hat-stringer-sidewall surface is oblique to or perpendicular to the first-hat-stringer-leg surface;
the hat-stringer-connecting-wall surface is arcuate;
the virtual hat-stringer-connecting-wall symmetry plane extends perpendicular to the first-hat-stringer-leg surface and the second-hat-stringer-leg surface; and the second-hat-stringer-sidewall surface is planar, wherein the second-hat-stringer-sidewall surface is oblique to or perpendicular to the second-hat-stringer-leg surface.

3. The vented hat stringer according to claim 1, wherein the ventilation-opening centerline intersects the virtual hat-stringer-connecting-wall symmetry plane.

4. The vented hat stringer according to claim 3, wherein the ventilation-opening centerline and the virtual hat-stringer-connecting-wall symmetry plane define therebetween a ventilation-opening included angle (a), which is less than 90°.

5. The vented hat stringer according to claim 1, wherein:
the ventilation opening comprises a circumferential edge; and
the circumferential edge is curvilinear in its entirety.

6. The vented hat stringer according to claim 5, wherein:
the ventilation opening defines a ventilation-opening centroid; and
the circumferential edge comprises concave portions when viewed from the ventilation-opening centroid.

7. The vented hat stringer according to claim 6, wherein the circumferential edge comprises convex portions when viewed from the ventilation-opening centroid.

8. The vented hat stringer of claim 7, wherein the circumferential edge further comprises two concave portions, joined together by one of the convex portions.

9. The vented hat stringer according to claim 1, further comprising a hat-stringer base wall, coupled to the first hat-stringer leg and to the second hat-stringer leg.

10. The vented hat stringer according to claim 9, further comprising a hat-stringer cavity, which is in fluidic communication with the ventilation opening, wherein the first hat-stringer sidewall, the hat-stringer connecting wall, the second hat-stringer sidewall, and a portion of the hat-stringer base wall form at least a portion of the hat-stringer cavity.

11. The vented hat stringer according to claim 1, further comprising a fitting that comprises:
a fitting connecting wall, which is in contact with the hat-stringer connecting wall and which comprises a fitting opening that extends through the fitting connecting wall and is in fluidic communication with the ventilation opening;
a fitting duct, comprising an outboard duct end that is coupled to the fitting connecting wall, and an inboard duct end that is spaced away from the fitting connecting wall, wherein the fitting duct defines a duct passage, which is in fluidic communication with the fitting opening; and
a fitting interface, coupled to the inboard duct end of the fitting duct.

12. The vented hat stringer according to claim 11, wherein:
the duct passage extends along a duct axis, which is a central axis of the duct passage and which intersects the virtual hat-stringer-connecting-wall symmetry plane; and
the duct axis is oblique to the virtual hat-stringer-connecting-wall symmetry plane.

13. The vented hat stringer according to claim 12, wherein the duct axis and the virtual hat-stringer-connecting-wall symmetry plane define therebetween a duct-axis included angle ($\beta$), which is less than 90°.

14. The vented hat stringer according to claim 11, wherein the fitting further comprises a first fitting base leg, which is in contact with the first hat-stringer leg, and a second fitting base leg, which is in contact with the second hat-stringer leg.

15. The vented hat stringer according to claim 1, further comprising a reinforcement, surrounding the ventilation opening.

16. The vented hat stringer according to claim 15, wherein the reinforcement comprises a first reinforcement base leg, coupled to the first hat-stringer leg, a second reinforcement base leg, coupled to the second hat-stringer leg, a first reinforcement sidewall, coupled to the first hat-stringer sidewall, a second reinforcement sidewall, coupled to the second hat-stringer sidewall, and a reinforcement connecting wall, coupled to the hat-stringer connecting wall.

17. The vented hat stringer according to claim 16, wherein:
the first reinforcement base leg comprises a first-reinforcement-base-leg central portion and two first-reinforcement-base-leg tapered portions, extending from the first-reinforcement-base-leg central portion in opposite directions; and
the first-reinforcement-base-leg central portion has a uniform thickness.

18. The vented hat stringer according to claim 17, wherein:
the second reinforcement base leg comprises a second-reinforcement-base-leg central portion and two second-reinforcement-base-leg tapered portions, extending from the second-reinforcement-base-leg central portion in opposite directions; and
the second-reinforcement-base-leg central portion has a uniform thickness.

19. A method of forming the vented hat stringer according to claim 1, the method comprising forming each of the first hat-stringer leg, the second hat-stringer leg, the first hat-stringer sidewall, the hat-stringer connecting wall, and the second hat-stringer sidewall from a plurality of plies of composite material such that the ventilation-opening centerline does not coincide with the virtual hat-stringer-connecting-wall symmetry plane.

20. An aircraft, comprising:
a skin portion, having an inner side; and
the vented hat stringer according to claim 1;
wherein the vented hat stringer is coupled to the inner side of the skin portion.

* * * * *